(12) United States Patent
Wang (10) Patent No.: US 9,195,264 B2
(45) Date of Patent: Nov. 24, 2015

(54) SUPPORTING APPARATUS AND DISPLAY DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Hua-Yong Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 180 days.

(21) Appl. No.: 14/085,815

(22) Filed: Nov. 21, 2013

(65) Prior Publication Data

US 2014/0160658 A1 Jun. 12, 2014

(30) Foreign Application Priority Data

Dec. 7, 2012 (CN) .......................... 2012 1 05218066

(51) Int. Cl.
*G06F 1/16* (2006.01)
*F16M 11/10* (2006.01)
*F16M 11/18* (2006.01)

(52) U.S. Cl.
CPC ............. *G06F 1/1601* (2013.01); *F16M 11/10* (2013.01); *F16M 11/18* (2013.01); *F16M 2200/08* (2013.01)

(58) Field of Classification Search
CPC ...................................................... G06F 1/1601
USPC ........... 361/679.06, 679.07, 679.22; 248/422, 248/918
See application file for complete search history.

(56) References Cited

U.S. PATENT DOCUMENTS

| | | | |
|---|---|---|---|
| 6,354,552 B1 * | 3/2002 | Chiu | 248/422 |
| 6,816,177 B2 * | 11/2004 | Wang et al. | 345/156 |
| 7,353,053 B2 * | 4/2008 | Prichard et al. | 455/575.4 |
| 8,295,652 B1 * | 10/2012 | Newstead | 382/311 |
| 8,659,884 B2 * | 2/2014 | Segar et al. | 361/679.22 |
| 8,891,248 B2 * | 11/2014 | Chu et al. | 361/807 |
| 2005/0051693 A1 * | 3/2005 | Chu | 248/371 |
| 2007/0064379 A1 * | 3/2007 | Shin | 361/681 |
| 2008/0204983 A1 * | 8/2008 | Smejkalova | 361/681 |
| 2009/0184224 A1 * | 7/2009 | Gan et al. | 248/283.1 |
| 2009/0314912 A1 * | 12/2009 | Whitley et al. | 248/299.1 |
| 2010/0002165 A1 * | 1/2010 | Chen et al. | 349/58 |
| 2013/0240686 A1 * | 9/2013 | Wang | 248/122.1 |

* cited by examiner

*Primary Examiner* — Adrian S Wilson
(74) *Attorney, Agent, or Firm* — Novak Druce Connolly Bove + Quigg LLP (57) ABSTRACT

A display device includes a display, a base, a stand for supporting the display on the base, and a rotating panel accommodated in the base. The stand has one end fixed to the display and an opposite end connected to the rotating panel. The rotating panel is rotatably connected to the base, and the stand is rotatable with the rotating panel. A supporting apparatus for supporting a display device is also provided.

14 Claims, 11 Drawing Sheets

SUPPORTING APPARATUS AND DISPLAY DEVICE USING THE SAME

BACKGROUND

1. Technical Field

The present disclosure relates to display devices, and particularly to a display device having a supporting base capable of adjusting an angle of the display device.

2. Description of Related Art

Display devices can be rotated at different angles to help users view the display devices comfortably. However, it is often inconvenient and troublesome to adjust the angle of the display device.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure, including the accompanying, is illustrated by way of example and not by way of limitation. It should be noted that references to "an" or "one" embodiment in this disclosure are not necessarily to the same embodiment, and such references mean "at least one."

Figure 1:
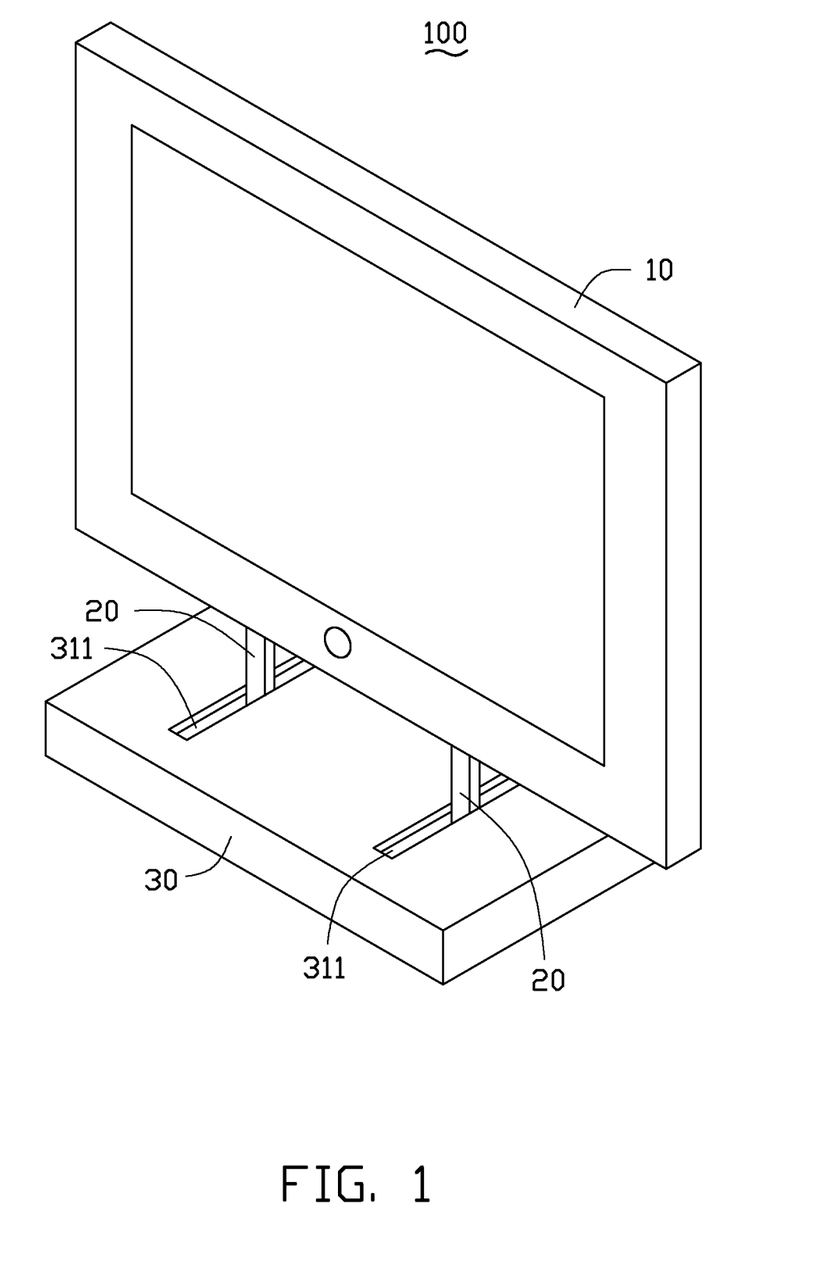
FIG. 1 is an isometric view of a display device having a supporting apparatus in accordance with an exemplary embodiment.
Figure 2:
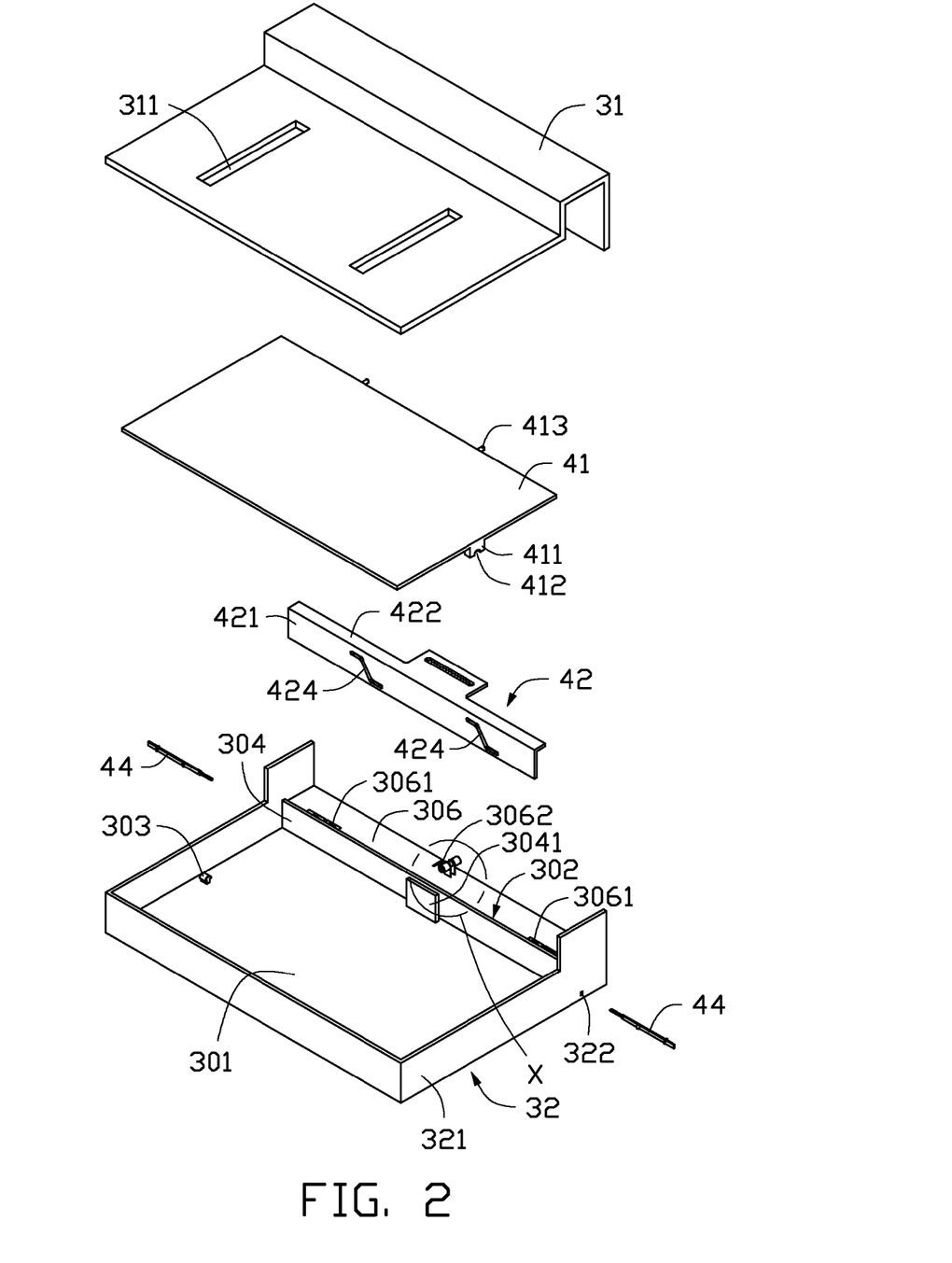
FIG. 2 is an exploded view of the supporting apparatus of FIG. 1.
Figure 3:
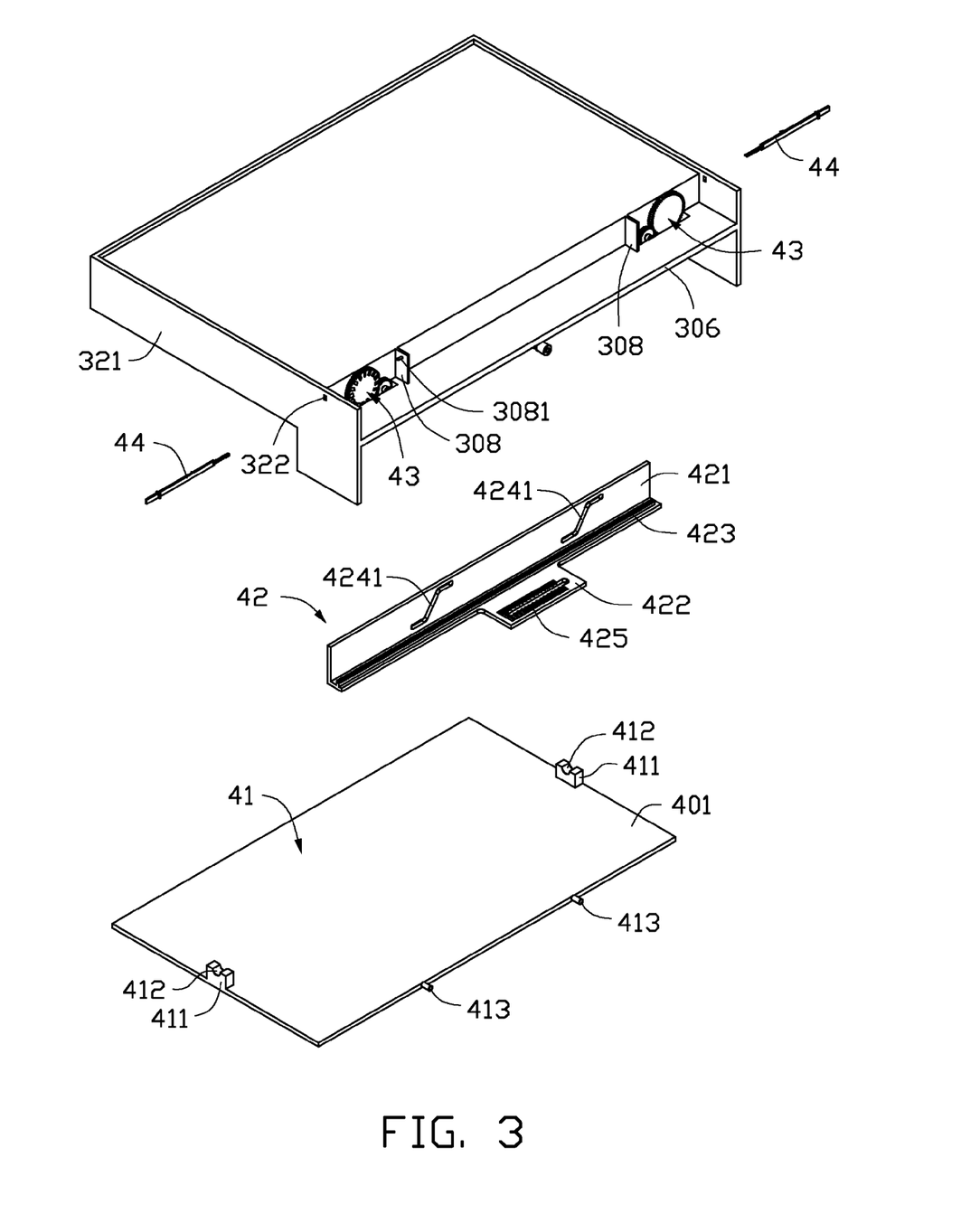
FIG. 3 is similar to FIG. 2, but viewed from another aspect.

Referring to FIGS. 1-3, a display device 100 includes a display 10 and a supporting apparatus (not labeled), the supporting apparatus includes a base apparatus 30 and a stand 20 for supporting the display 10. The stand 20 is two rods. One end of each rod is fixed to the display 10, and an opposite end of each rod is fixed to the base apparatus 30.

The base apparatus 30 further includes a main body 32 and a cover 31 covering the main body 32. A rotating assembly is accommodated in the main body 32. The rotating assembly includes a rotating panel 41, a guiding member 42, a gear set 43, and a driving bar 44. In this embodiment, two first through slots 311 corresponding to the stand 20 are defined in the cover 31. One end of the rods of the stand 20 passes through a corresponding first through slot 311 and connects to the rotating panel 41. The rotating panel 41 is rotatably connected to the main body 32. Thus, the display 10 can be rotated back and forth along the through slots 311.

In one embodiment, two connecting portions 303 protrude from an inner bottom surface 301 of the main body 32. The two connecting portions 303 are located adjacent to opposite ends of the main body 32, respectively. The connecting portion 303 includes a protruding portion and a half-cylinder portion formed on a top end of the protruding portion.

Two protrusions 411 protrude from a bottom surface 401 of the rotating panel 41. The two protrusions 411 are located adjacent to opposite ends of the rotating panel 41 and correspond to the two connecting portions 303. A groove 412 corresponding to the half-cylinder portion of the connecting portion 303 is defined in an end of each protrusion 411. The half-cylinder portions of the connecting portions 303 are rotatably received in the grooves 412 of the protrusions 411. Thus, the rotating panel 41 is rotatably connected to the main body 32.

In other embodiments, a hole is defined in each protrusion 411, and two pivots are formed on the inner bottom surface 301 of the main body 32. Thus, the rotating panel 41 is rotatable about the pivots.

The rotating panel 41 includes at least one guiding portion 413 protruding from a side edge of the rotating panel 41. In one embodiment, there are two guiding portions 413. The guiding portion 413 is a shaft protruding from a side edge of the rotating panel 41. A step 302 is formed on the inner bottom surface 301 of the main body 32. The step 302 includes a first surface 306 and a second surface 304 connected substantially perpendicularly to the first surface 306. The first surface 306 is substantially parallel to the inner bottom surface 301 of the main body 32, and the second surface 304 is substantially perpendicular to the inner bottom surface 301. Two connecting plates 308 extend substantially perpendicularly from a back surface of the second surface 304. Each connecting plate 308 is adjacent to a corresponding sidewall 321. Each connection plate 308 forms a protrusion 3081.

Figure 4:
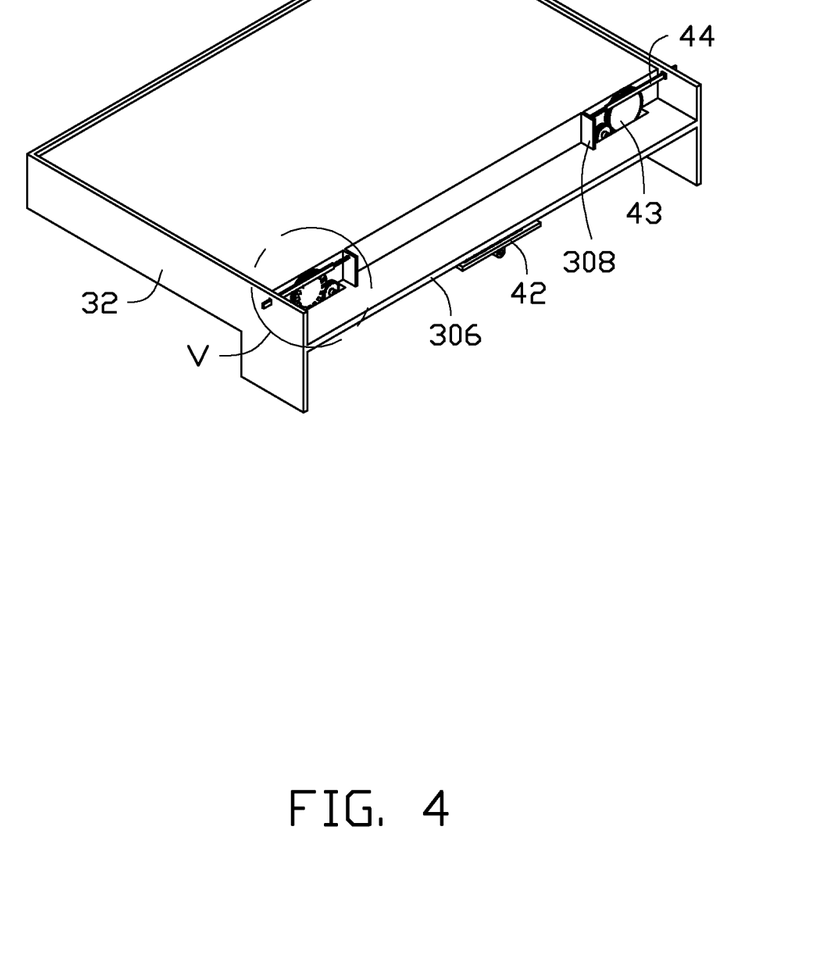
FIG. 4 is an assembled view of a housing of the apparatus of FIG. 2.
Figure 5:
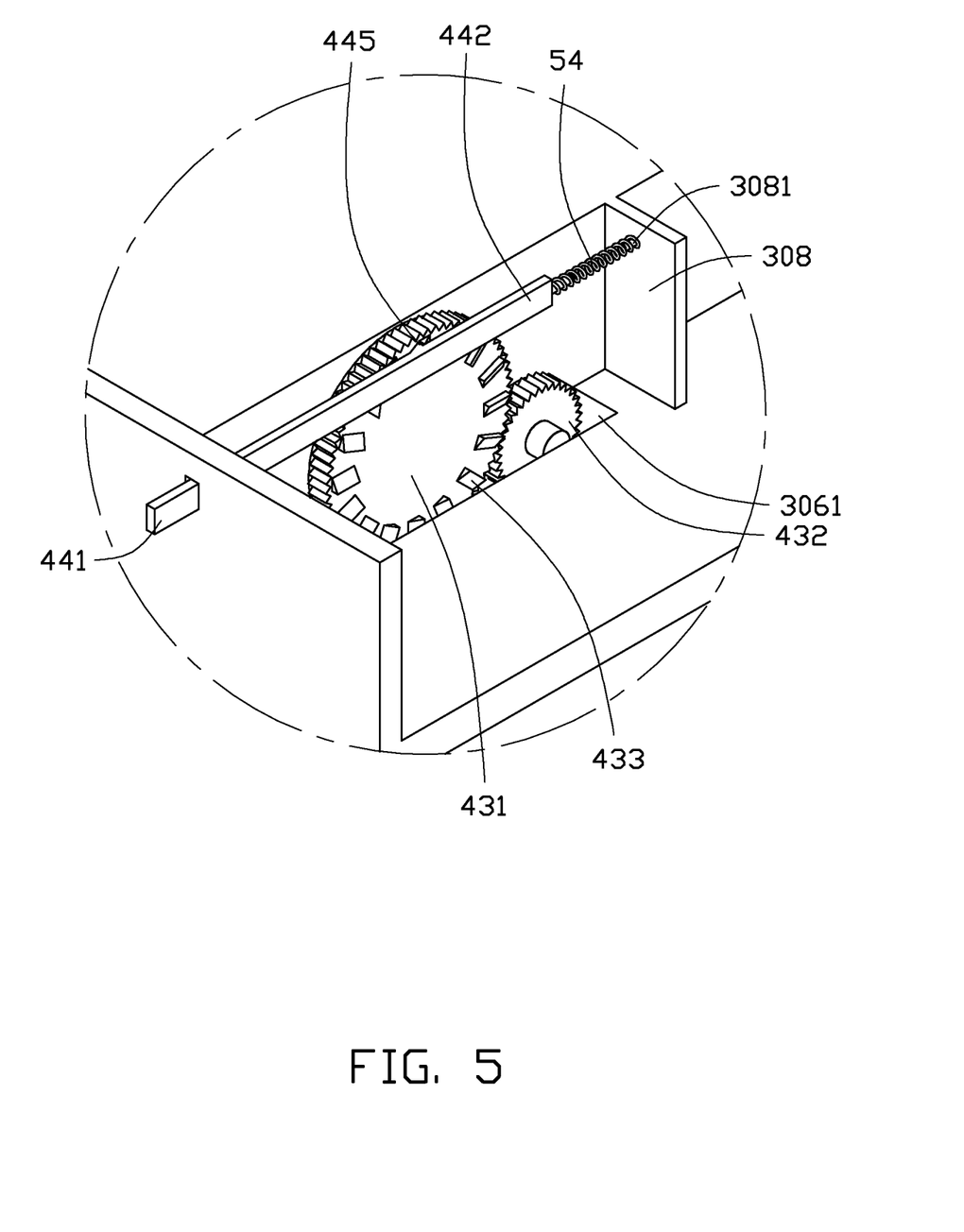
FIG. 5 is an enlarged view of a circled portion V of FIG. 4.
Figure 6:
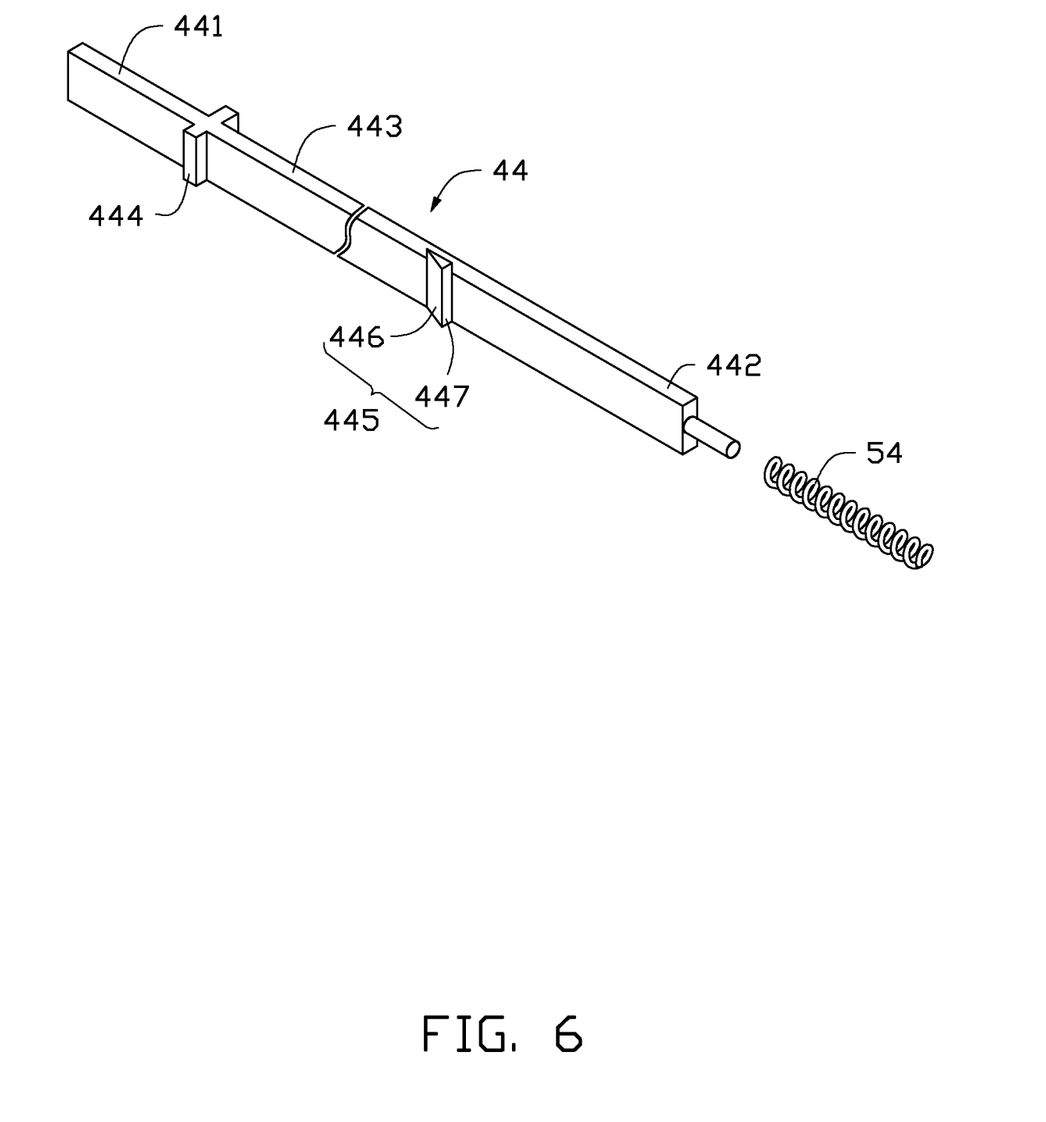
FIG. 6 is a schematic view showing a driving bar of the supporting apparatus of FIG. 1.

Referring to FIGS. 4-6, at least one sidewall 321 of the main body 32 defines a second through hole 322. In one embodiment, there are two second through holes 322 corresponding one-to-one to the two driving bars 44.

The driving bar 44 includes a rod body 443, a first end portion 441 at one end of the rod body 443, and a second end portion 442 at another end of the rod body 443. The first end portion 441 extends through the second through hole 322 of the sidewall 321, and the second end portion 442 is connected to the connecting plate 308 of the second surface 304 via a spring 54. One end of the spring 54 is connected to the protrusion 3081 of the connection plate 308. A stopper portion 444 is formed on the rod body 443 for preventing the second end portion 442 from passing through the second through hole 322. In one embodiment, the stopper portion 444 is formed adjacent to the first end portion 441.

The driving bar 44 is used to drive the gear set 43. In one embodiment, two gear sets 43 are assembled on an outer side of the second surface 304. Each gear set 43 corresponds to a second through hole 322. Each of the gear sets 43 includes at least one gear. In one embodiment, the gear set 43 includes a first gear 431 and a second gear 432 engaged with the first gear 431. A diameter of the first gear 431 is greater than a diameter of the second gear 432. A number of ribs 433 protrude from a surface of the first gear 431, and the ribs 433 are arranged around a rotating axis of the first gear 431.

In one embodiment, two driving bars 44 are employed, and each of the driving bars 44 further includes a wedge 445. The wedge 445 includes a slanted surface 446 and a flat surface 447 substantially perpendicular to the driving bar 44. When the first end portion 441 of the driving bar 44 is pushed, the spring 54 is compressed, and the flat surface 447 pushes one of the ribs 433 of the first gear 431 to drive the first gear 431 to rotate. When the driving bar 44 is released, the spring 54 restores to return the driving bar 44 to an original position. Thus, as the first end portion 441 of the driving bar 44 is pushed, the first gear 431 is rotated at intervals defined by a spacing of the ribs 433.

Two openings 3061 are defined in the first surface 306. Each opening 3061 is adjacent to a corresponding end of the second surface 304. The two openings 3061 correspond to the second gears 432. Each second gear 432 is partially received in a corresponding opening 3061.

Referring again to FIGS. 2 and 3, the guiding member 42 includes a first guiding sidewall 421 and a second guiding sidewall 422 substantially perpendicular to the first guiding sidewall 421. The guiding member 42 is arranged on the step 302.

A holding portion 3041 is arranged on the second surface 304 of the step 302, and a sliding slot (not shown) is defined between the holding portion 3041 and the second surface 304. A width of the sliding slot is greater than a thickness of the first guiding sidewall 421, such that the first guiding sidewall 421 is received and slidable in the sliding slot. The second guiding sidewall 422 of the guiding member 42 is arranged on the first surface 306, and a guiding rack 423 is formed on a surface of the second guiding sidewall 422. The guiding rack 423 engages with teeth of the second gear 432 extending out of the opening 3061. Thus, the guiding member 42 is driven to slide along the step 302 when the second gear 432 rotates.

At least one guiding slot 424 is defined in the first guiding sidewall 421 of the guiding member 42. In one embodiment, there are two guiding slots 424, and each of the guiding slots 424 receives one of the guiding portions 413. Each of the guiding slots 424 includes an obliquely oriented slanted portion 4241 sloping toward the inner bottom surface 301 of the main body 32.

Figure 7:
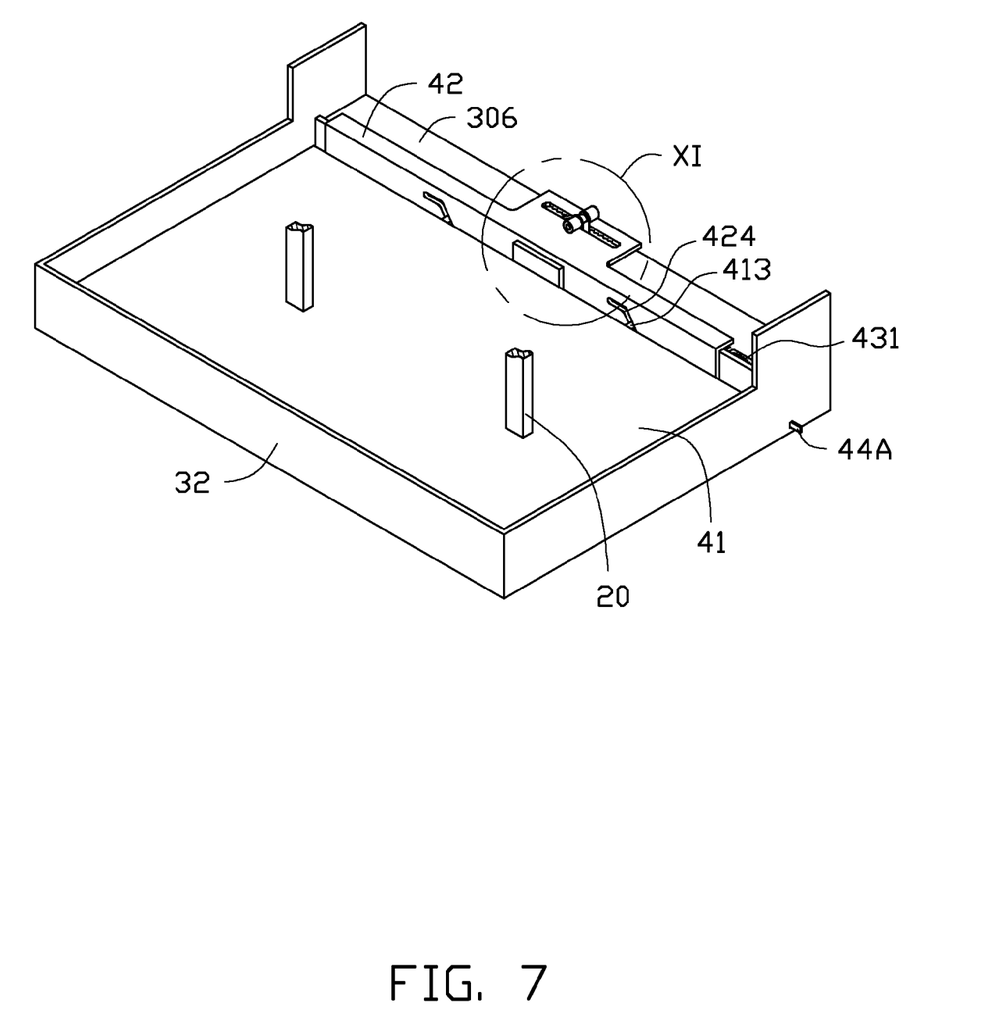
FIG. 7 is an assembled view of the housing of the apparatus of FIG. 2.
Figure 8:
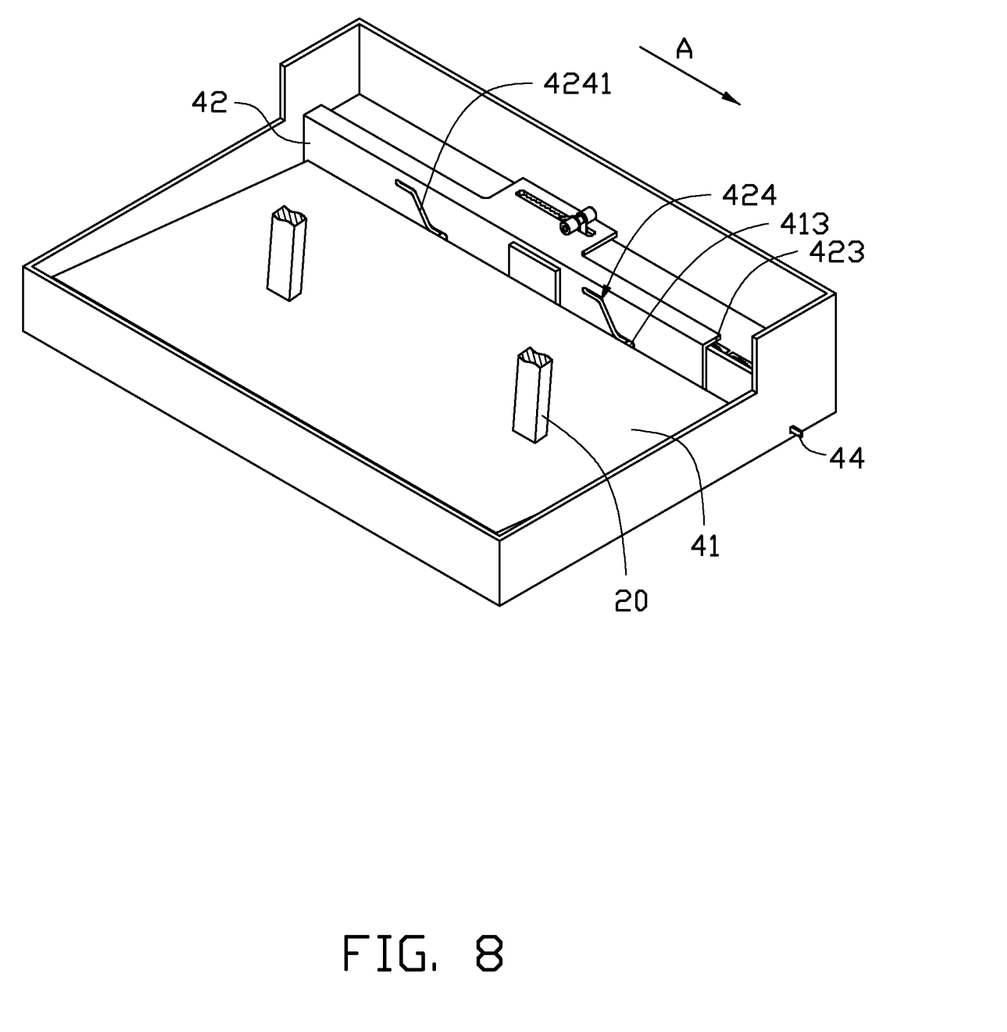
FIG. 8 is a schematic view showing a rotating panel of the supporting apparatus of FIG. 7 in a first state.

Referring to FIGS. 7 and 8, when a driving bar 44A is pushed to drive the gear set 43, the second gear 432 is rotated by the first gear 431. The rotating second gear 432 causes the guiding member 42 to slide along the step 302 because of engagement between the guiding rack 423 and the second gear 432. In detail, when the driving bar 44A is pushed, the guiding member 42 slides along a direction A (shown in FIG. 8). Thus, the guiding portions 413 slide up the guiding slots 424, and the rotating panel 41 rotates about the connecting portions 303, causing the display 10 to rotate forward. In FIG. 8, the guiding portion 413 is in the lowest position of the guiding slot 424, and the display 10 is in the most rearward position.

Figure 9:
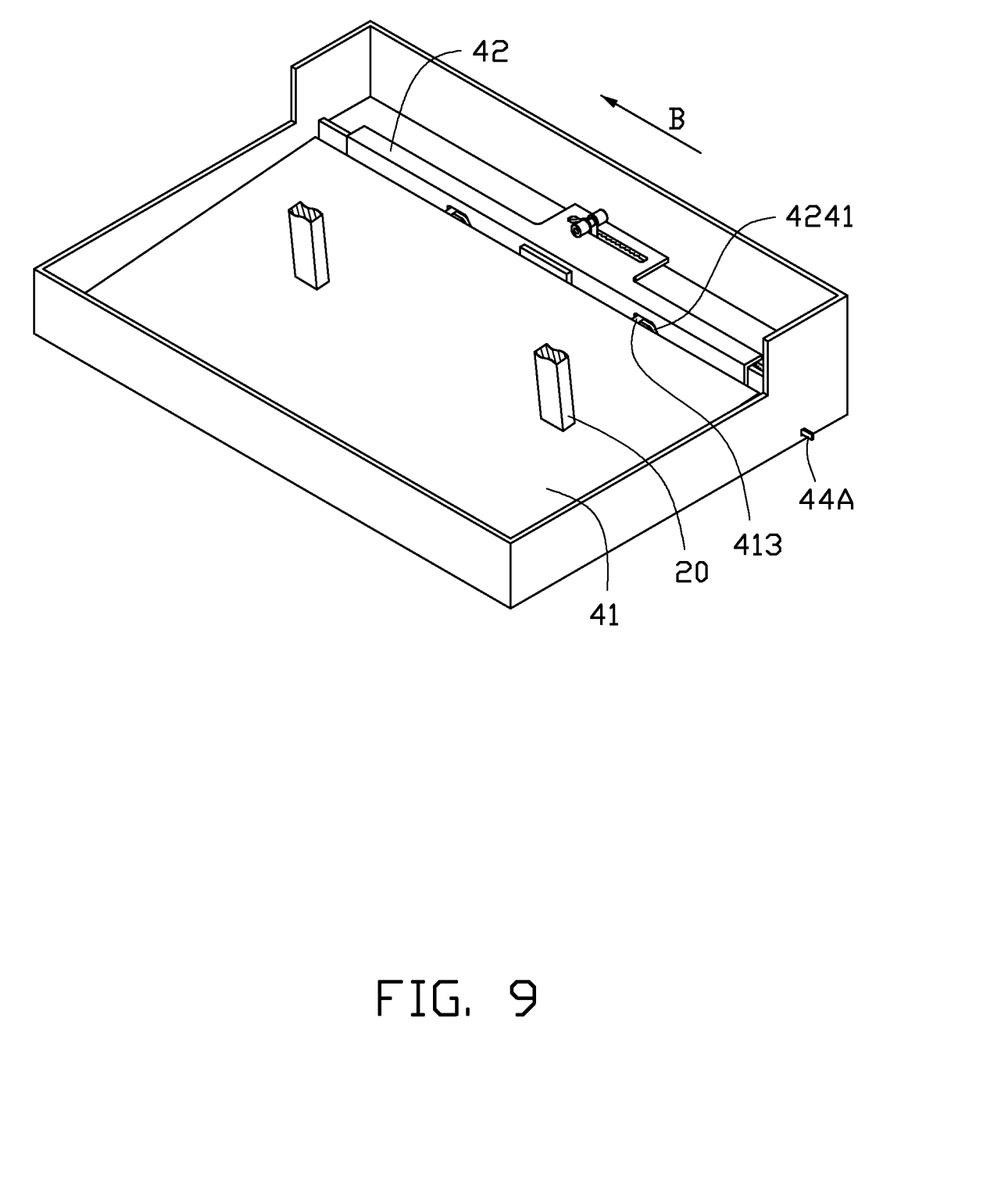
FIG. 9 is a schematic view showing the rotating panel of the supporting apparatus of FIG. 7 in a second state.

Referring to FIGS. 7 and 9, when the other driving bar (not shown) is pushed, the guiding member 42 slides along a direction B. Thus, the guiding portions 413 slide down the guiding slots 424, and the rotating panel 41 rotates about the connecting portions 303, causing the display 10 to rotate rearward. In FIG. 9, the guiding portions 413 are in the highest position of the guiding slots 424, and the display 10 is in the most forward position.

Referring further to FIGS. 2 and 3, in one embodiment, the second guiding sidewall 422 of the guiding member 42 further includes a number of restriction teeth 425, a protrusion protrudes from the first surface 306, and an elastic arm 3062 extends from an angle toward the first surface 306 from a free end of the protrusion.

Figure 10:
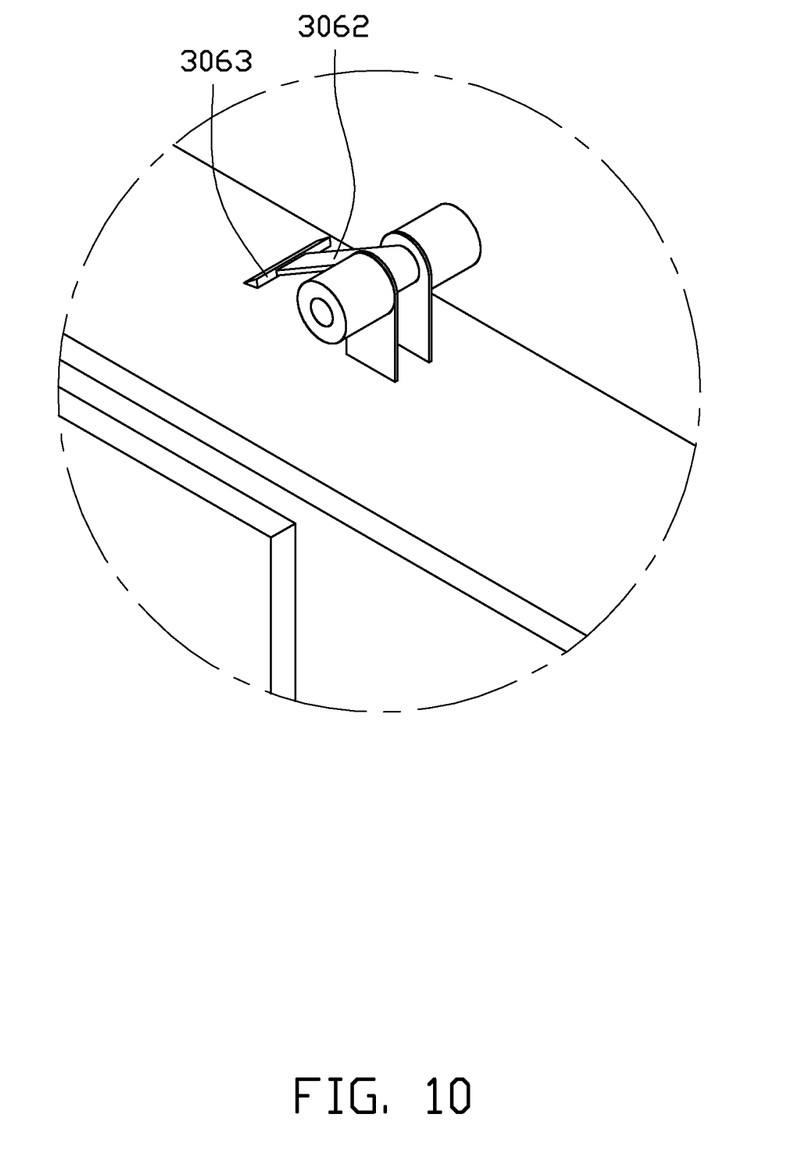
FIG. 10 is an enlarged view of a circled portion X of FIG. 2.
Figure 11:
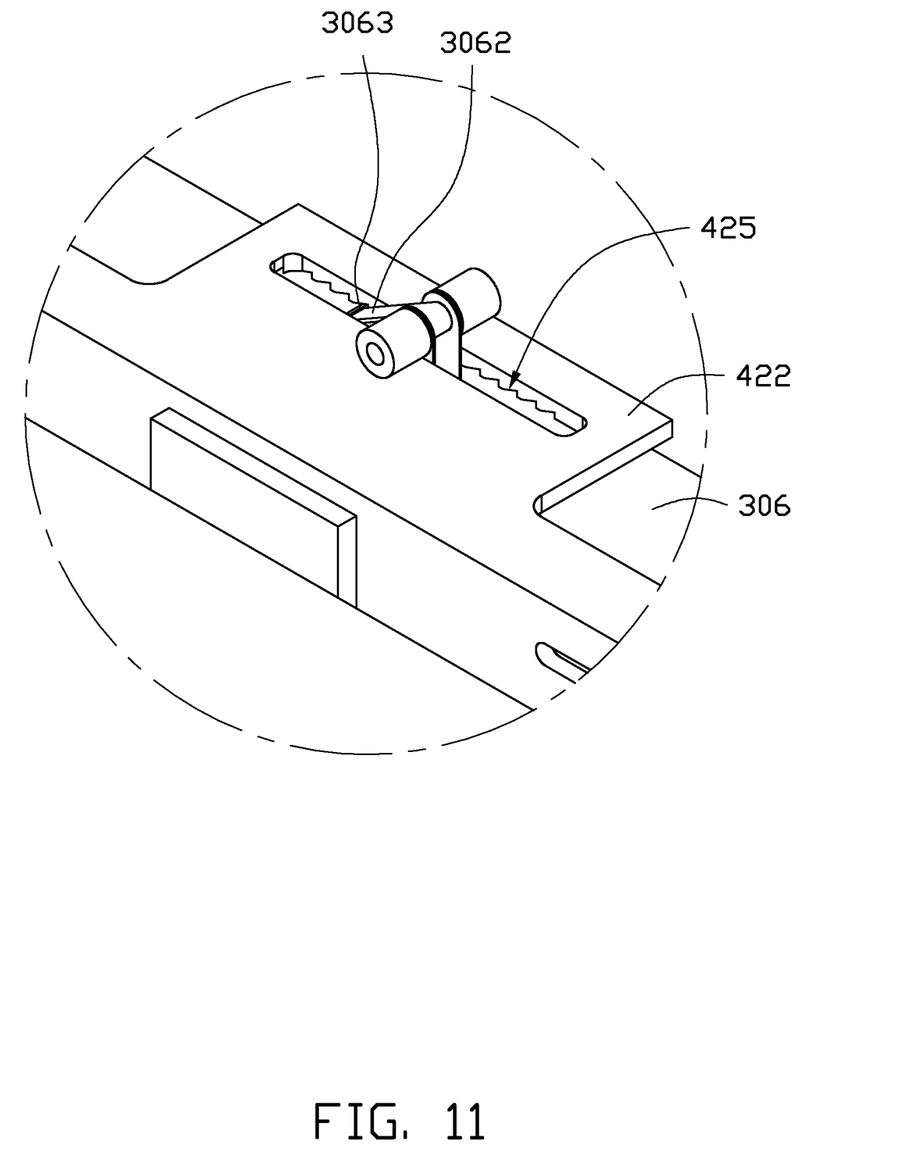
FIG. 11 is an enlarged schematic view of a circled portion XI of FIG. 7.

Referring to FIGS. 10 and 11, a clasp 3063 is formed on a distal end of the elastic arm 3062. The clasp 3063 engages with the restriction teeth 425 of the guiding member 42 to prevent the guiding portions 413 from sliding down the guiding slots 424 due to gravity. The elastic arm 3062 deforms elastically when the guiding member 42 slides along the step 302, thereby releasing the clasp 3063 from the restriction teeth 425. Thus, the guiding member 42 can slide smoothly along the step 302.

In other embodiments, the guiding member 42 is a plate that engages with the gear set 43. The guiding member 42 can also include just one guiding slot 424 and/or just one gear set to drive the rotating panel 41 to rotate.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A display device comprising a display, a base defining a through hole, a stand for supporting the display, and a rotating assembly accommodated in the base; the rotating assembly comprising:
    a gear set comprising a gear;
    a spring;
    a driving bar comprising a rod body, a first end portion extending through the through hole of the base, a second end portion connected to the base through the spring, and a wedge configured to drive the gear set;
    a guiding member comprising an obliquely oriented guiding slot sloping toward an inner bottom surface of the base and a guiding rack engaged with the gear; and
    a rotating panel rotatably connected to the base, and comprising a guiding portion protruding from a sidewall of the rotating panel corresponding to the guiding slot; and
    wherein the stand comprises an end fixed to the display and an opposite end connected to the rotating panel, the guiding portion of the rotating panel is accommodated in the guiding slot, the driving bar drives the guiding portion to slide in the base through the gear set, the guiding portion moves up or down along the guiding slot so as to drive the rotating panel to rotate.

2. The display device according to claim 1, wherein the base defines a through slot, the end of the stand passes through the through slot and is connected to the rotating panel.

3. The display device according to claim 2, wherein a connecting portion protrudes from the inner bottom surface of the base, and the connecting portion comprises a half cylinder portion formed on a free end of the connecting portion, the rotating panel is a plate, a protrusion protrudes from a bottom surface of the rotating panel, and a groove is defined in an end of the protrusion and matches the half cylinder portion of the connecting portion, the half-cylinder portion is rotatably received in the groove, thus rotatably connecting the rotating panel to the connecting portion.

4. The display device according to claim 1, wherein a step is formed on the inner bottom surface of the base; the guiding member is arranged on the step, and the guiding member comprises a first guiding sidewall and a second guiding sidewall; the guiding slot is formed in the first guiding sidewall, the guiding rack is formed on the second guiding sidewall.

5. The display device according to claim 4, wherein a plurality of restriction teeth are arranged on the second guiding sidewall, an elastic arm extends from an angle toward the step; a clasp is formed on a free end of the elastic arm to engage with the restriction teeth to prevent the guiding portion from sliding down the guiding slot due to gravity; the elastic arm deforms elastically when the guiding member slides along the step, and the clasp releases the restriction teeth.

6. The display device according to claim 1, wherein the gear comprises a plurality of ribs protruding from a lateral surface thereof; the wedge of the driving bar resists against one of the ribs to drive the gear to rotate.

7. The display device according to claim 6, wherein the wedge of the driving bar comprises a slanted surface and a flat surface perpendicular to the driving bar, when the first end of the driving bar is pushed, the spring is compressed, and the flat surface of the wedge resists against the rib of the gear.

8. A supporting apparatus for supporting a display device, comprising a base, a stand for supporting a display on the base, and a rotating assembly accommodated in the base; the rotating assembly comprising:
- a gear set comprising a gear;
- a driving bar comprising a rod body, a first end portion extending through a through hole of the base, a second end portion connected to the base through a spring, and a wedge to drive the gear set;
- a guiding member comprising an obliquely oriented guiding slot sloping toward an inner bottom surface of the base and a guiding rack engaged with the gear; and
- a rotating panel rotatably connected to the base, and comprising a guiding portion protruding from a sidewall of the rotating panel corresponding to the guiding slot; and
- wherein the stand comprises an end fixed to the display and an opposite end connected to the rotating panel, the guiding portion of the rotating panel is accommodated in the guiding slot, the driving bar drives the guiding portion to slide in the base through the gear set, the guiding portion moves up or down along the guiding slot so as to drive the rotating panel to rotate.

9. The supporting apparatus according to claim 8, wherein the base defines a through slot, the end of the stand passes through the through slot and is connected to the rotating panel.

10. The supporting apparatus according to claim 8, wherein a connecting portion protrudes from the inner bottom surface of the base, and the connecting portion comprises a half cylinder portion formed on a free end of the connecting portion, the rotating panel is a plate, a protrusion protrudes from a bottom surface of the rotating panel, and a groove is defined in an end of the protrusion and matches the half cylinder portion of the connecting portion, the half-cylinder portion is rotatably received in the groove, thus rotatably connecting the rotating panel to the connecting portion.

11. The supporting apparatus according to claim 8, wherein a step is formed on the inner bottom surface of the base; the guiding member is arranged on the step, and the guiding member comprises a first guiding sidewall and a second guiding sidewall; the guiding slot is formed in the first guiding sidewall, the guiding rack is formed on the second guiding sidewall.

12. The supporting apparatus according to claim 11, wherein a plurality of restriction teeth are arranged on the second guiding sidewall, an elastic arm extends from an angle toward the step; a clasp is formed on a free end of the elastic arm to engage with the restriction teeth to prevent the guiding portion from sliding down the guiding slot due to gravity; the elastic arm deforms elastically when the guiding member slides along the step, and the clasp releases the restriction teeth.

13. The supporting apparatus according to claim 8, wherein the gear comprises a plurality of ribs protruding from a lateral surface thereof; the wedge of the driving bar resists against one of the ribs to drive the gear to rotate.

14. The supporting apparatus according to claim 13, wherein the wedge of the driving bar comprises a slanted surface and a flat surface perpendicular to the driving bar, when the first end of the driving bar is pushed, the spring is compressed, and the flat surface of the wedge resists against the rib of the gear.

* * * * *